United States Patent
Lokhandwalla et al.

(10) Patent No.: US 8,456,048 B2
(45) Date of Patent: Jun. 4, 2013

(54) COOLING STRUCTURE FOR A SEGMENTED STATOR ASSEMBLY

(75) Inventors: Murtuza Lokhandwalla, Clifton Park, NY (US); Jay Zhiqiang Cao, Clifton Park, NY (US); William Dwight Gerstler, Niskayuna, NY (US); Kiruba Sivasubramaniam Haran, Clifton Park, NY (US); Robert Michael Zirin, Niskayuna, NY (US); Xiaochun Shen, Cohoes, NY (US)

(73) Assignee: General Electric Company, Niskayuna, NY (US)

( * ) Notice: Subject to any disclaimer, the term of this patent is extended or adjusted under 35 U.S.C. 154(b) by 302 days.

(21) Appl. No.: 12/893,197

(22) Filed: Sep. 29, 2010

(65) Prior Publication Data

US 2011/0140552 A1    Jun. 16, 2011

(51) Int. Cl.
*H02K 9/00* (2006.01)
(52) U.S. Cl.
USPC ............................... 310/65; 310/59
(58) Field of Classification Search
USPC .................... 310/58, 59, 60 R, 60 A, 65
See application file for complete search history.

(56) References Cited

U.S. PATENT DOCUMENTS

| | | | | |
|---|---|---|---|---|
| 854,717 A | * | 5/1907 | Coffman | 310/65 |
| 2,381,297 A | * | 8/1945 | Clarence | 310/61 |
| 2,618,756 A | * | 11/1952 | Fechheimer | 310/54 |
| 3,116,429 A | * | 12/1963 | Harrington et al. | 310/64 |
| 3,597,645 A | * | 8/1971 | Duffert et al. | 310/14 |
| 4,182,966 A | * | 1/1980 | Mishra et al. | 310/59 |
| 4,208,597 A | * | 6/1980 | Mulach et al. | 310/59 |
| 4,286,183 A | | 8/1981 | Montgomery | |
| 4,352,034 A | * | 9/1982 | Karhan et al. | 310/59 |
| 6,268,668 B1 | * | 7/2001 | Jarczynski et al. | 310/52 |
| 7,242,119 B2 | | 7/2007 | Gomes De Lima | |
| 7,427,814 B2 | | 9/2008 | Bagepalli et al. | |

FOREIGN PATENT DOCUMENTS

| | | |
|---|---|---|
| EP | 2182617 A1 | 5/2010 |
| WO | 0117094 A1 | 3/2001 |

OTHER PUBLICATIONS

Search Report from corresponding DK Application No. PA201170506 dated Mar. 15, 2012.

* cited by examiner

*Primary Examiner* — Tran Nguyen
(74) *Attorney, Agent, or Firm* — Ann M. Agosti

(57) ABSTRACT

A stator assembly includes a segmented stator having stator portions. Each stator portion includes stator laminations having stator windings, spacer plates having a portion embedded within the stator laminations, and structural plates having a portion embedded within the stator laminations. The portion of each of the spacer plates and each of the structural plates has notch-like structures that create openings to allow a cooling medium to flow between the notch-like structures to provide radial cooling of the stator windings. Connectors are provided to connect the stator portions of the segmented stator together.

12 Claims, 6 Drawing Sheets

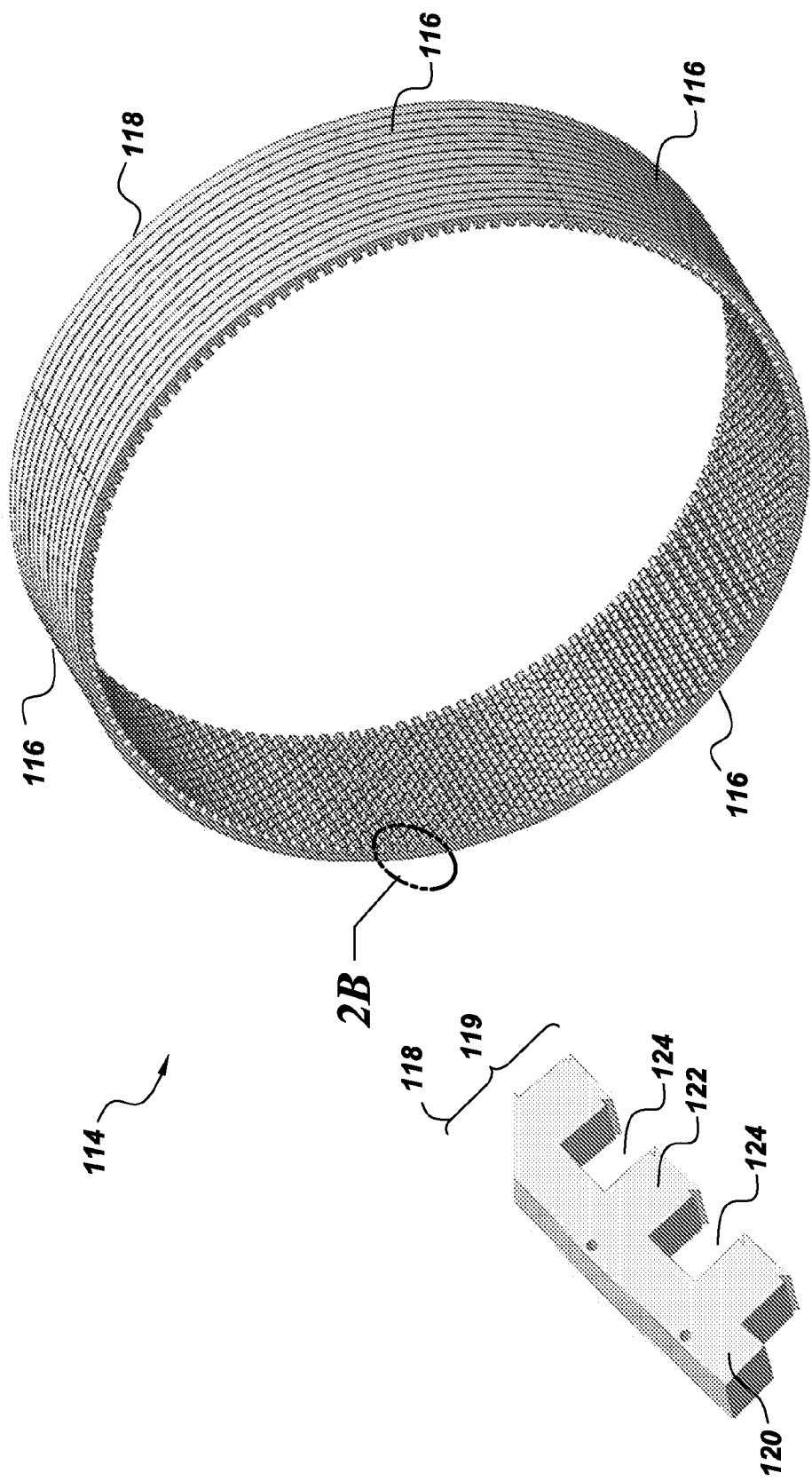

COOLING STRUCTURE FOR A SEGMENTED STATOR ASSEMBLY

RELATED APPLICATIONS

This application is related to co-pending applications entitled "Segmented Stator Assembly," U.S. Ser. Nos. 12/871,276 and 12/871,351, both filed on Aug. 30, 2010.

BACKGROUND

Generators have been widely used in a variety of applications including aircraft, automobiles and turbines. Generators typically include a stator and a rotor that work together to produce electricity. Wind turbines have received increased attention recently as an environmentally safe alternative energy source. Wind turbines convert the kinetic energy of the wind into mechanical power and then the mechanical power drives the generator to produce electricity.

Offshore wind turbines typically have ratings of 3MW and higher, necessitated by the economics of wind energy production. Also offshore turbines employ a direct drive generator to improve reliability, unlike most land based utility scale wind turbines that utilize a geared generator. These ratings and the fact that the generator is directly driven manifests into a very large size and weight. A machine greater than 4 m in diameter is difficult and costly to transport by conventional means and necessitates segmentation. While the segmented stator structures facilitate cost and transport, particularly when designed to accommodate conventional rail or road shipping constraints, they are difficult to manufacture and assemble at site.

In order to reach high power density, the stator core requires a certain level of cooling through the stator laminations. Stator assemblies typically have spacers or inside space blocks located at certain axial locations between two adjacent laminations. These spacers are repeated after a nominal axial distance and provide a radial flow path for a cooling medium. While the spacer blocks provide for a gas flow path for stator cooling, they are limited in their ability to provide structural support to the stator or stator segment, particularly for very large stator assemblies.

For these and other reasons, there is a need for the present invention.

SUMMARY

A stator assembly includes a segmented stator having stator portions. Each stator portion includes stator laminations having stator windings, spacer plates having a portion embedded within the stator laminations, and structural plates having a portion embedded within the stator laminations. The portion of each of the spacer plates and each of the structural plates has notch-like structures that create openings to allow a cooling medium to flow between the notch-like structures to provide radial cooling of the stator windings. Connectors are provided to connect the stator portions of the segmented stator together.

BRIEF DESCRIPTION OF THE DRAWINGS

The nature and various additional features of embodiments of the invention will appear more fully upon consideration of the illustrative embodiments of the invention which are schematically set forth in the figures. Like reference numerals represent corresponding parts.

FIG. 2A illustrates a diagrammatic view of a stator assembly according to an exemplary embodiment of the present invention FIG. 2B illustrates a blown-up view of a portion of the stator assembly shown in FIG. 2A;

While the above-identified drawing figures set forth alternative embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION

Embodiments of the present invention will be explained in further detail by making reference to the accompanying drawings, which do not limit the scope of the invention in any way.

Exemplary embodiments of the invention disclosed herein are shown in the context of a generator for a wind turbine. However, this is only an example for the purpose of description. It is to be understood that the stator assembly according to embodiments of the invention can be used in any electric machine. In addition, the generator can be a direct drive generator or any other generator used for electric machines.

Figure 1:
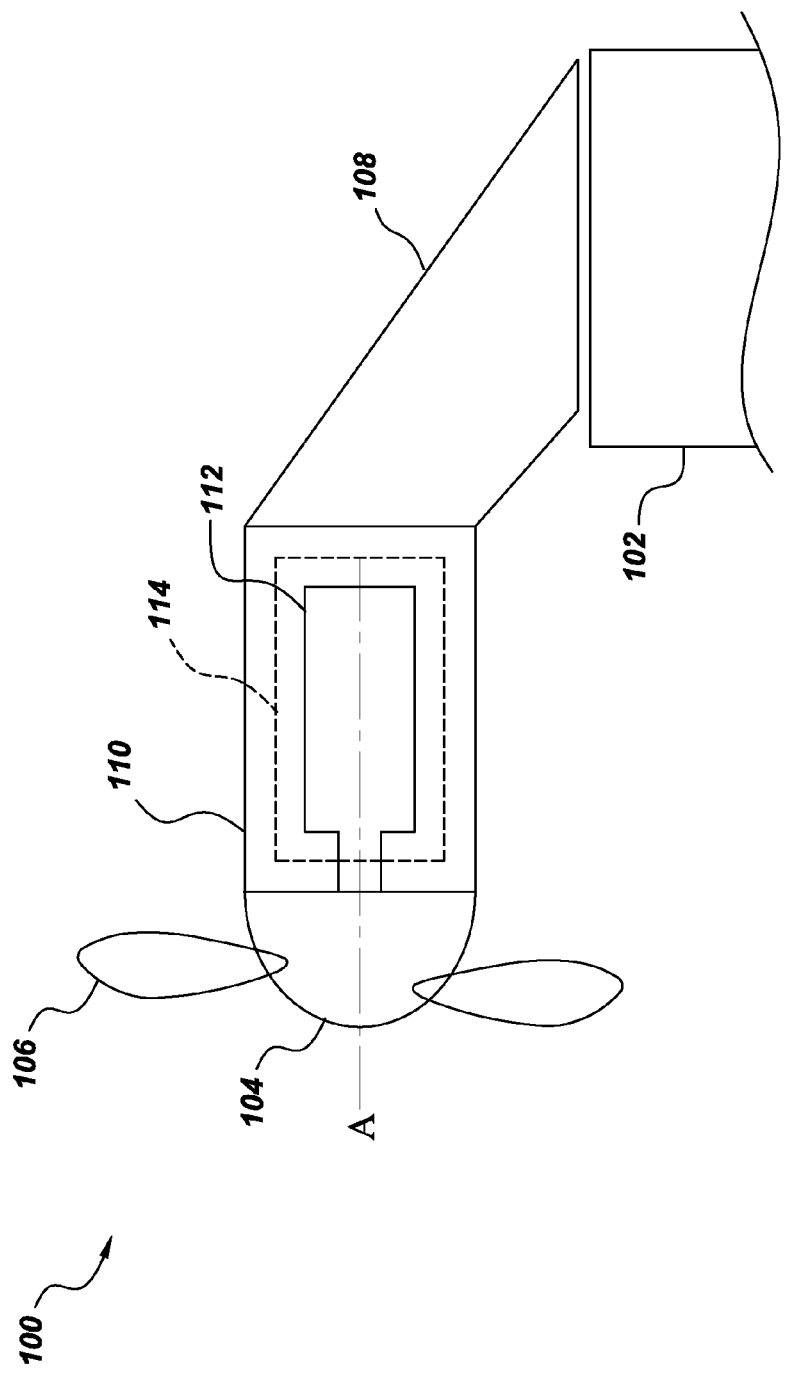
FIG. 1 illustrates a wind turbine having a stator assembly according to an exemplary embodiment of the invention.

FIG. 1 illustrates a wind turbine 100 arranged on a tower 102 having a hub 104 with blades 106. A generator 110 is provided on an extension 108 of the tower. The generator 110 includes a rotor assembly 112 and a stator assembly 114. An exemplary segmented stator assembly 114 is shown in more detail in FIGS. 2A and 2B.

FIG. 2A illustrates a diagrammatic view of a segmented stator (windings not shown) according to an exemplary embodiment of the invention. The segmented stator assembly 114 includes stator segments or portions 116 each having stator laminations 118. In the example illustrated, four stator segments are shown. However, it is to be understood that the invention is not limited in this regard and that there can be any number of stator segments. FIG. 2B is a blown-up view of portion 119 of the segmented stator 114, which shows that each stator segment 116 includes stator laminations 118 each having a yoke or back iron 120 and stator teeth 122 defining stator openings 124. The stator openings 124 are provided to accommodate windings 136 (shown in FIG. 4).

Figure 3A:
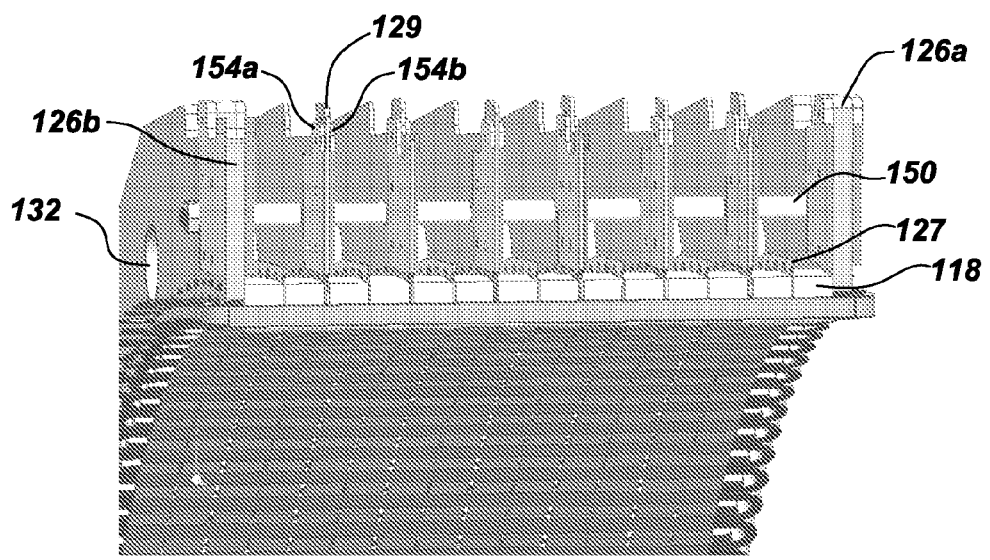
FIGS. 3A-3C illustrate cross-sectional views of a stator segment or portion of a stator assembly according to an exemplary embodiment of the present invention.
Figure 3B:
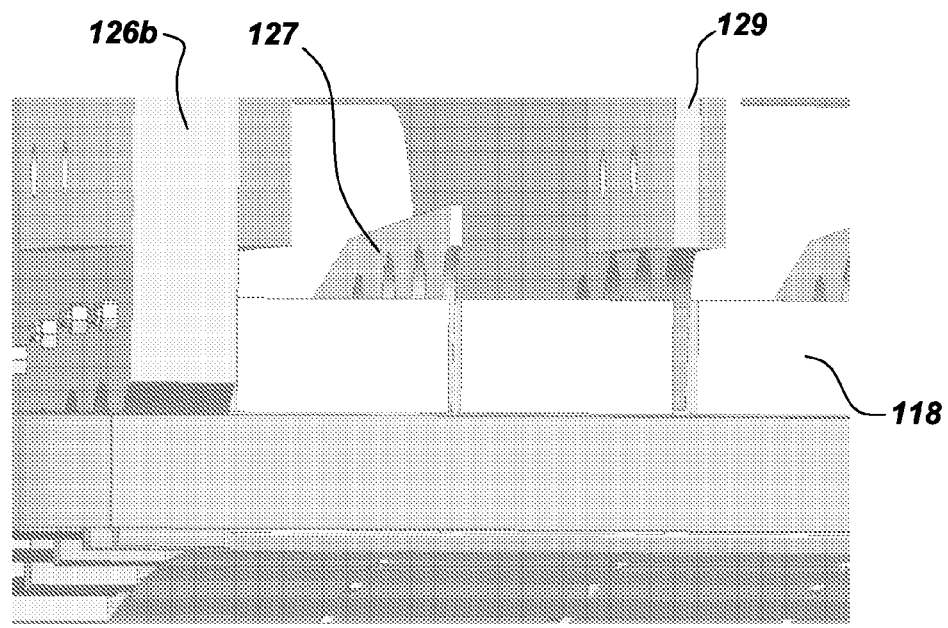
Figure 3C:
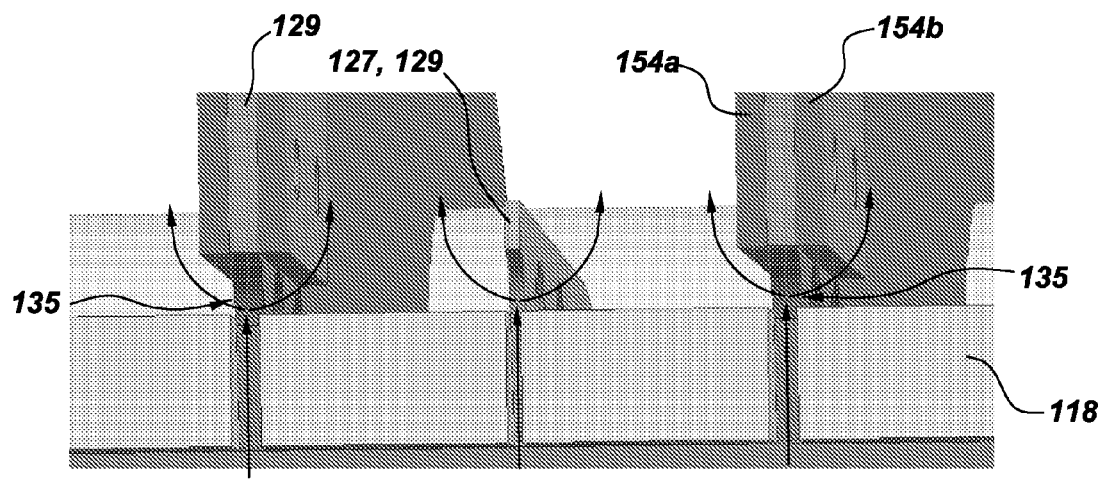

FIGS. 3A-3C illustrate cross-sectional views of an exemplary embodiment. Each stator segment 116 includes end plates 126a and 126b. The end plates 126a and 126b are arranged exterior to spacer plates 127 in an axial direction. The spacer plates 127 are embedded within the stator lamination 118. The spacer plates 127 shown in the exemplary embodiment protrude radially beyond the stator yoke 120. However, embodiments of the invention are not limited to this arrangement. For example, the spacer plates 127 can be essentially the same size as the laminations, radially smaller than the laminations or radially larger. Any number of spacer plates 127 can be used to achieve the desired cooling.

In addition, structural plates 129 are embedded within the stator laminations 118. FIGS. 3A and 3B further illustrate the spacer elements 150 or rods coupling the end plates 126a, 126b and the structural plates 129 together. In this exemplary embodiment, the end plates 126a, 126b and the structural plates 129 protrude above the stator laminations to accommodate openings 132, for receiving stabilizing elements 148 (shown in FIG. 5) that are used to coupled the end plates 126a, 126b and the structural plates 129 together for a more rigid stator segment 116. The figure also shows spice plates 154a, 154b. In this exemplary embodiment, the splice plates 154a, 154b are provided to coupled the end plates 126a, 126b and the structural plates 129 of one stator segment 116 to the corresponding end plates 126a, 126b and structural plates 129 of an adjacent stator segment 116. However, it will be appreciated that the stator segments 116 can be coupled together by any suitable means to maintain the strength and structural integrity of the segmented stator assembly 114. For example, the end plates and the structural plates between adjacent stator segments could be joined by using additional overlapping plates and bolts/rivets. Alternatively, these plates could be welded. Although individual lamination segments do not possess hoop strength, the formation of a continuous ring by joining these structural plates provides the desired hoop stiffness to the stator core typical of a continuous 360 degree ring. The structural plates perform a dual function as a structural element and as a spacer to provide a passage for radial air flow.

The structural plates 129 are included in each stator segment 116 to provide additional support and rigidity to the stator segment 116. The structural plates 129 are also embedded within the stator laminations 118. The structural plates 129 shown in the exemplary embodiment protrude radially beyond the stator yoke 120, as well as beyond the spacer plates 127. The end plates 126a, 126b can be of the same or different thickness than the structural plates 129. For example, the end plates 126a, 126b can be significantly thicker than the structural plates 129 to provide for structural integrity when the stator segments 116 are assembled to form the segmented stator assembly 114. In the example shown, the end plates 126a, 126b are not embedded within the stator laminations 118. However, other embodiments may include the end plates 126a, 126b embedded within the stator laminations 118 and being configured as a structural plate.

Figure 4:
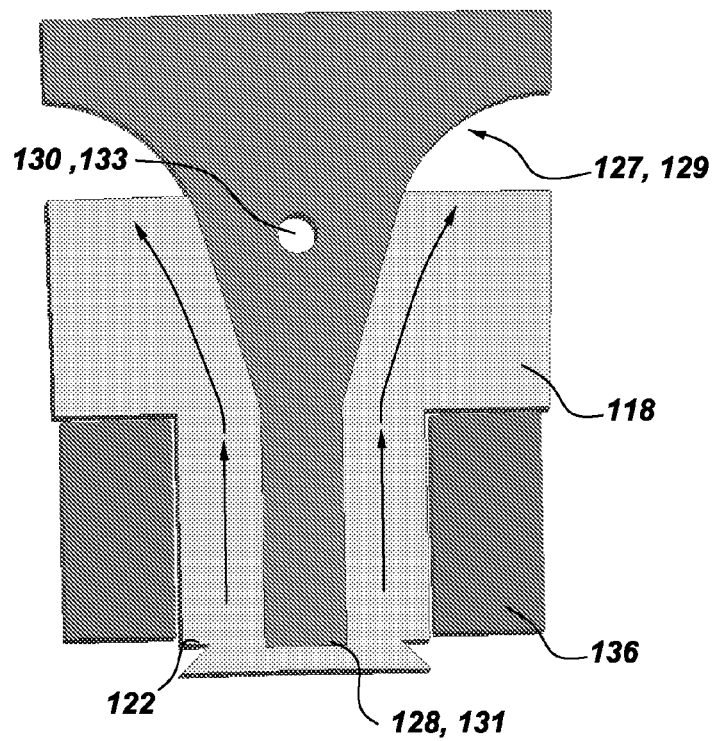
FIG. 4 illustrates a cross-sectional view of a stator segment according to an exemplary embodiment.

FIG. 3C includes arrows that show the flow of the cooling medium via each cavity 135 formed by the comb-like shape and arrangement of the spacer plates 127, and the structural plates 129 with respect to the teeth 122 of the stator laminations 118. FIG. 4 illustrates another view of the flow of the cooling medium as shown by the arrows to cool the coil or windings 136.

Figure 5:
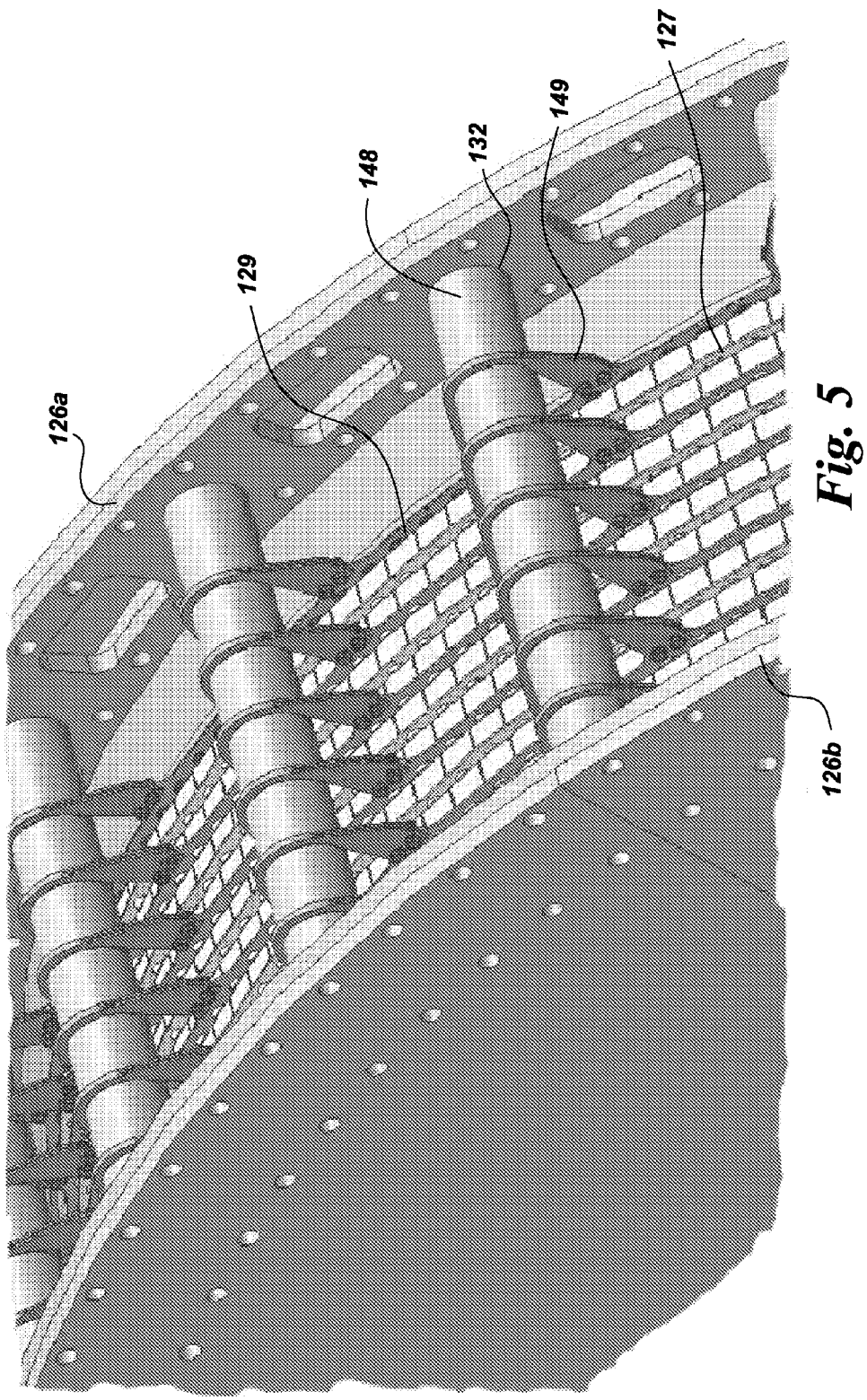
FIG. 5 illustrates a top view of a stator segment or portion of a stator assembly according to an exemplary embodiment of the invention.

Another exemplary embodiment of a stator segment 116 is illustrated in FIG. 5. In this arrangement, the structural plates 129 protrude radially above the stator laminations 118. However, the structural plates 129 are reduced in size and are coupled to the stabilizing elements 148 via hanging members 149. Hanging members 149 are coupled to each of structural plates 129 periodically to accommodate corresponding stabilizing elements 148. The handing members 149 are secured to the structural plates 129 by any suitable means such as bolts or welding.

Figure 6:
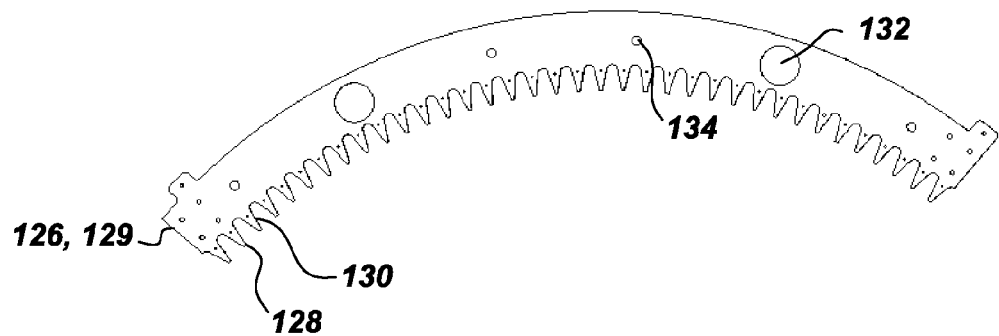
FIG. 6 illustrates a side view of structural plate according to an exemplary embodiment of the invention.

Referring to FIG. 6, each of the structural plates 129, and the end plates 126a, 126b in some embodiments, includes notch-like or tooth-like structures 128 formed on a portion along an inner circumference. The structural plates 129 are embedded into the stator laminations 118, as shown in FIGS. 3A-3C, 4 and 5, via the teeth 128. The end plates 126a, 126b and the structural plates 129 protrude radially beyond the stator core 120 to facilitate coupling of the end plates 126a, 126b and the structural plates 129 to provide structural integrity to the stator segment 116. The number of structural plates 129 to include in the stator segments is selected depending on the design and application. The thickness and material of the end plates 126a, 126b and the structural plates 129 are of a size and material to minimize performance loss. For example, the plates can be low carbon steel to keep the design low cost or could be nominally non-magnetic (e.g. stainless steel, aluminum or copper) to prevent any significant eddy current losses but at the added cost of these materials.

Embedded end plates 126a, 126b and the structural plates 129 each include an opening 130 proximate each of the teeth 128 for receiving a securing member or a connector such as a tension rod or bolt, for example. Any suitable connector can be used and the opening can be arranged to accommodate the corresponding connector. The connector goes through the stator core 120 and the openings 130 in the end plates 126a, 126b and the structural plates 129. The tension rods or through-bolts can be secured by nuts to hold the segmented stator portion 116 together.

Referring to FIGS. 3A, 5, and 6, each of the end plates 126a, 126b and the structural plates 129 further includes openings 132 to receive additional connectors or stabilizing elements 148 such as pipes, I-beams, or some other suitable stabilizing elements to connect the end plates 126a, 126b and the structural plates 129 together. The additional connectors 148 provide support and rigidity to the stator segment 116 via the end plates 126a, 126b and the structural plates 129, which will provide structural integrity to the stator assembly 114 when the stator segments 116 are secured together. Embedded end plates 126a, 126b and the structural plates 129 may further include openings 134 to accommodate spacer elements 150 to provide another connection point for the end plates 126a, 126b and the structural plates 129. The spacer elements 150 can be any suitably rigid elements such as bolts, rivets or weldments, for example. The stabilizing elements 148 can be used alone or in combination with any number of spacer elements 150.

While exemplary embodiments of the end plates 126a, 126b and the structural plates 129 have been illustrated with multiple sets of openings 130, 132 and 134 to accommodate multiple sets of connectors, one skilled in the art will appreciate that embodiments are not limited to this arrangement and any single set of openings and connectors can be used to secure the end plates 126a, 126b and the structural plates 129 of the stator segment 116, or any combination of the sets of openings and respective connectors can be used. The location and size of the sets of openings depend upon the application and configuration of the stator segment. In addition, the end plates 126a, 126b in embodiments of the invention can be configured without the notch-like structures 128 and associates openings 130, and even openings 134.

Figure 7A:
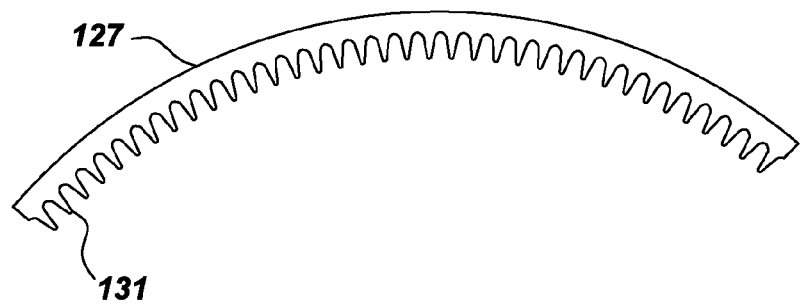
FIGS. 7A and 7B illustrate side views of spacer plates according to exemplary embodiments.
Figure 7B:
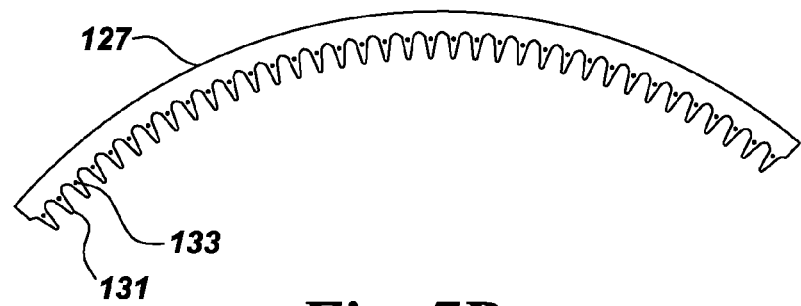

FIGS. 7A and 7B illustrate exemplary embodiments of the spacer plates 127. As shown in the figures, each of the spacer plates 127 includes notch-like or tooth-like structures 131 formed on a portion of the spacer plates 127 along an inner circumference. The spacer plates 127 are embedded into the stator laminations 118, as shown in FIGS. 3A-3C, and 4-6 via the teeth 131. The spacer plates 127 and the structural plates 129 each have portions with tooth-like or notch like structures 128, 131 and are approximately the same in circumferential length in the embodiment shown. However, the spacer plates 127 can have any suitable circumferential length. Each of the spacer plates 127 and the structural plates 129 are aligned so that they are profiled in the vicinity of the stator tooth 122 such that a gap or cavity 135 exists between the spacer plate 127 and the windings or coils 136 and between the portion of the structural plates 129 and the windings 136, as shown in FIG. 3C. These gaps 135 allow a cooling medium such as air or hydrogen to flow radially from the electromagnetic air gap (not shown) to outside the stator 114. The end plates 126a, 126b and the structural plates 129 of adjacent stator segments 116 are fastened together to form a continuous stator structure 114. More particularly, the profile leaves a physical gap 135 between the stator coils 136 and the structural plates 129 and the spacer 127 plates. Also this profile is shaped such that it forms a continuous cavity 135 from the electromagnetic air gap 164 to the outside of the stator assembly 114. This allows air to flow from the air gap, past the coils to outside the stator assembly 114. The air flow path could also be reversed if desired to suit an overall ventilation scheme.

The spacer plate 127 shown in FIG. 7A does not include any openings and is not coupled to the end plates 126a, 126b or the structural plates 129. However, as shown in FIG. 7B, in some embodiments, each spacer plate 127 includes openings 133 proximate each of the teeth 131 for receiving a securing member or a connector such as a tension rod or bolt, for example, to couple the spacer plates 127 and the structural plates 129 and the end plates 126a, 126b, when the end plates are embedded. Any suitable connector can be used and the opening can be arranged to accommodate the corresponding connector. The connector goes through the stator laminations 118 and the openings 133 in the spacer plates 127 as well as the openings 130 in the end plates 126a, 126b and the structural plates 129. The tension rods or through-bolts can be secured by nuts to hold the segmented stator portion 116 together.

The size, number and location of the spacer plates 127 to include in the stator segments 116 are selected depending on the design and application. The thickness and material of the spacer plates 127 are of a size and material to minimize performance loss. In the embodiments shown, the structural plates 129 perform the function of spacer plates, as well as providing overall structural integrity to the stator segments 116 and the segmented stator assembly 114. The spacer plates 127 can also be formed of a material and size that contribute to the overall structural integrity of the stator segments 116 as well.

A relatively thin, non-structural, cover (not shown) could be fabricated around the structural plates to form a casing to avoid a large cylindrical casing. These structural features could serve as a manifold and inlet/exit path for the ventilation scheme, however alternate schemes could also be utilized.

In the embodiments shown, concentrated windings or tooth wound coils are utilized to allow a clean segmentation. However, lap wound or distributed windings could be used.

Embodiments of the invention can include any combination of spacer plates 127 and structural plates 129 together with end plates 126a, 126b. In addition, the spacer plates 127 and/or the structural plates 129 can be used in any type of stator segment. The number and type of spacer plates 127 and/or structural plates 129 will vary depending on the application and desired cooling.

In the embodiments disclosed herein, a segmented stator assembly includes stator segments that provide for more cost effective shipping and installation and sufficient cooling of the windings while maintaining the strength and structural integrity of the large assemblies to achieve desired performance requirements. The stator segments can be of a size that can be shipped in industry standard shipping containers, thereby reducing the cost of shipping.

The electric machines discussed herein may be well suited for wind turbine applications. However, such machines may be employed in a variety of other applications.

While the invention has been described in terms of various specific embodiments, those skilled in the art will recognize that the invention can be practiced with modification within the spirit and scope of the claims.

What is claimed is:

1. A stator assembly, comprising:
   a segmented stator having stator portions, wherein each stator portion comprises:
   stator laminations having stator windings;
   spacer plates having a portion embedded within the stator laminations; and
   structural plates having a portion embedded within the stator laminations;
   wherein the portion of each of the spacer plates and the portion of each of the structural plates comprises notch structures creating openings to allow a cooling medium to flow between the notch structures to provide radial cooling of the stator windings; and
   connectors to connect the stator portions of the segmented stator together.

2. The segmented stator assembly of claim 1, wherein each of the stator portions further comprises:
   end plates arranged axially on opposing sides of the stator portion; and
   stabilizing elements coupling the endplates together.

3. The stator assembly of claim 2, wherein a portion of each of the end plates is embedded within the stator laminations.

4. The stator assembly of claim 1, wherein the portion of each of the spacer plates and the portion of each of the structural plates comprise openings to receive securing members respectively to secure the spacer plates and the structural plates together.

5. The stator assembly of claim 2, wherein each of the stabilizing elements comprises a pipe.

6. The stator assembly of claim 2, wherein each of the end plates and the structural plates comprises openings to receive the stabilizing members.

7. The stator assembly of claim 2, wherein each of the connectors comprises splice plates arranged axially on either side of each of the end plates, and on either side of the support plates to secure the end plates and the support plates of adjacent stator portions together.

8. The stator assembly of claim 1, wherein the notch structures of the spacer plates and the structural plates are configured to maximize the flow of the cooling medium.

9. The stator assembly of claim 1, wherein the structural plates are configured to provide structural support to the stator portion and to allow the cooling medium to provide radial cooling of the stator windings.

10. An electric machine, comprising:
    a rotor arranged to rotate about an axis; and
    a stator assembly, separated from the rotor by an air gap, wherein the stator assembly comprises:
    a segmented stator having stator portions, wherein each stator portion comprises:
    stator laminations having stator windings, wherein the air gap provides for axial cooling of the stator portion and the stator windings; and
    spacer plates having a portion embedded within the stator laminations; and structural plates having a portion embedded within the stator laminations;

wherein the portion of each of the spacer plates and the portion of each of the structural plates comprise notch structures creating openings to allow the cooling medium to flow between the notch structures to provide radial cooling of the stator portion and the stator windings; and connectors to connect the stator portions of the segmented stator together.

11. The electric machine of claim 10, wherein each of the stator portions further comprises:

end plates arranged axially on opposing sides of the stator portion; and stabilizing elements coupling the endplates together.

12. The electric machine of claim 10, wherein the structural plates are configured to provide structural support to the stator portion and to allow the cooling medium to provide radial cooling of the stator windings.

* * * * *